US012471635B2

(12) United States Patent
Batista et al.

(10) Patent No.: US 12,471,635 B2
(45) Date of Patent: Nov. 18, 2025

(54) AEROSOL-GENERATING SYSTEM WITH LEAKAGE PREVENTION

(71) Applicant: Philip Morris Products S.A., Neuchatel (CH)

(72) Inventors: Rui Nuno Batista, Morges (CH); Ricardo Cali, Mannheim (DE); Daria Tzimoulis, La Croix-sur-Lutry (CH); Adela Sahraoui, Lausanne (CH)

(73) Assignee: Philip Morris Products S.A., Neuchatel (CH)

( * ) Notice: Subject to any disclaimer, the term of this patent is extended or adjusted under 35 U.S.C. 154(b) by 415 days.

(21) Appl. No.: 17/759,442

(22) PCT Filed: Jan. 22, 2021

(86) PCT No.: PCT/EP2021/051491

§ 371 (c)(1),
(2) Date: Jul. 26, 2022

(87) PCT Pub. No.: WO2021/151799

PCT Pub. Date: Aug. 5, 2021

(65) Prior Publication Data

US 2023/0068343 A1 Mar. 2, 2023

(30) Foreign Application Priority Data

Jan. 30, 2020 (EP) .................................... 20386005

(51) Int. Cl.
*A24F 40/485* (2020.01)
*A24F 40/10* (2020.01)
(Continued)

(52) U.S. Cl.
CPC ............ *A24F 40/485* (2020.01); *A24F 40/10* (2020.01); *A24F 40/20* (2020.01); *A24F 40/30* (2020.01);
(Continued)

(58) Field of Classification Search
None
See application file for complete search history.

(56) References Cited

U.S. PATENT DOCUMENTS

2015/0335075 A1 11/2015 Minskoff et al.
2017/0071251 A1 3/2017 Goch
(Continued)

FOREIGN PATENT DOCUMENTS

CA 3 100 749 A1 12/2019
CN 1196660 A 10/1998
(Continued)

OTHER PUBLICATIONS

International Search Report & Written Opinion issued Apr. 23, 2021 in PCT/EP2021/051491, filed on Jan. 22, 2021, 16 pages.
(Continued)

*Primary Examiner* — Michael H. Wilson
*Assistant Examiner* — Daniel Edward Vakili
(74) *Attorney, Agent, or Firm* — Oblon, McClelland, Maier & Neustadt, L.L.P.

(57) ABSTRACT

An aerosol-generating system is provided, including: a first air inlet and an air outlet; a liquid storage portion holding a liquid aerosol-forming substrate and having a liquid outlet and a storage portion air inlet; an airflow passage from the first air inlet to the air outlet past the liquid outlet; a wick in the airflow passage at a distance from the liquid outlet and to receive liquid from the liquid storage portion in response to a pressure drop in the airflow passage at the liquid outlet; and a first heating element to heat the liquid in the wick, and the airflow passage extending from the first air inlet to the air outlet past the storage portion air inlet and past the liquid outlet such that air enters the liquid storage portion via the storage portion air inlet and then travels therethrough and exits at the liquid outlet.

12 Claims, 6 Drawing Sheets

(51) Int. Cl.

| | |
|---|---|
| ***A24F 40/20*** | (2020.01) |
| ***A24F 40/30*** | (2020.01) |
| ***A24F 40/42*** | (2020.01) |
| ***A24F 40/44*** | (2020.01) |
| ***A24F 40/465*** | (2020.01) |
| ***H05B 6/10*** | (2006.01) |

(52) U.S. Cl.

CPC .............. *A24F 40/42* (2020.01); *A24F 40/44* (2020.01); *A24F 40/465* (2020.01); *H05B 6/108* (2013.01)

(56) References Cited

U.S. PATENT DOCUMENTS

| | | | | |
|---|---|---|---|---|
| 2018/0243520 | A1 | 8/2018 | Johnson et al. | |
| 2018/0249762 | A1 | 9/2018 | Daryani et al. | |
| 2020/0221782 | A1 * | 7/2020 | Lim ..................... | H05B 1/0227 |
| 2020/0375249 | A1 | 12/2020 | Yanez | |

FOREIGN PATENT DOCUMENTS

| | | | | |
|---|---|---|---|---|
| CN | 106470562 | A | 3/2017 | |
| CN | 108290016 | A | 7/2018 | |
| CN | 207766584 | U | 8/2018 | |
| CN | 108523247 | A | 9/2018 | |
| CN | 108887748 | A | 11/2018 | |
| CN | 113766840 | A | 12/2021 | |
| EA | 032128 | B1 | 4/2019 | |
| EP | 0 845 220 | A1 | 6/1998 | |
| JP | 3325028 | B2 | 7/2002 | |
| JP | 2019-505179 | A | 2/2019 | |
| KR | 1019980701138 | A | 5/1999 | |
| KZ | 31969 | B | 4/2017 | |
| RU | 2 608 915 | C2 | 1/2017 | |
| RU | 2 646 557 | C2 | 3/2018 | |
| WO | WO 2016/026156 | A1 | 2/2016 | |
| WO | WO 2017/108429 | A1 | 6/2017 | |
| WO | WO 2018/189195 | A1 | 10/2018 | |
| WO | WO-2020225534 | A1 * | 11/2020 | ............. A24F 40/10 |

OTHER PUBLICATIONS

International Preliminary Report on Patentability issued Dec. 2, 2021 in PCT/EP2021/051491, filed on Jan. 22, 2021, 8 pages.

Japanese Office Action issued Jun. 15, 2023 in Patent Application No. 2022-546124, 3 pages.

Russian Search Report issued on Dec. 29, 2022 in Russian Patent Application No. 2022123054 (with English translation), 4 pages.

Notice of Allowance issued on Jan. 23, 2025 in Korean Patent Application No. 10-2022-7025931 (with unedited computer-generated English translation), 5 pages.

Chinese Office Action and Search Report issued Mar. 5, 2025 in corresponding Chinese Patent Application No. 202180008512.0, with English Translation, 30 pages.

Chinese Office Action and Search Report issued Aug. 30, 2025 in corresponding Chinese Patent Application No. 202180008512.0, with English Translation, 26 pages, citing document 1 therein.

* cited by examiner

AEROSOL-GENERATING SYSTEM WITH LEAKAGE PREVENTION

The present invention relates to an aerosol-generating system.

It is known to provide an aerosol-generating system for generating an inhalable vapor. Such systems may heat an aerosol-forming substrate to a temperature at which one or more components of the aerosol-forming substrate are volatilised without burning the aerosol-forming substrate. The aerosol-forming substrate may be provided as part of an aerosol-generating article. The aerosol-generating article may have a rod shape for insertion of the aerosol-generating article into a cavity, such as a heating chamber, of the aerosol-generating system. A heating element may be arranged in or around the heating chamber for heating the aerosol-forming substrate once the aerosol-generating article is inserted into the heating chamber of the aerosol-generating system. In addition or as an alternative to the solid aerosol-forming substrate used in the aerosol-forming article, a liquid substrate may be utilized. Typically, the heating element is a metal coil that is coiled around a wick, where the two ends of the wick are in contact with the liquid substrate in the liquid reservoir. This way the wick is always saturated with liquid ready to be vaporized. The liquid in the wick is vaporized when the coil is heated by generating a current in it. Since the wick is in contact with the liquid substrate in the liquid reservoir, the liquid substrate that is vaporized from the wick by the heating coil is replenished by liquid from the liquid reservoir. This is often referred to as the "pumping action", and is in principle how most known e-cigarettes operate. A problem with these conventional systems is that the liquid substrate that is wicked to the wick after a puff may leak out of the system into the surroundings, such as a pocket of a user, and contaminate clothes, bags or other places wherein the system is kept, when not being used. The leakage of liquid may also contaminate other parts of the system, such as the electronics. Another problem with these conventional systems is that the liquid aerosol-forming substrate may be in the wick for an extended time before the user chooses to take the next puff. Therefore, the liquid in the wick may be in contact with the metal heating element (typically a coil), and may be exposed to the ambient air for an extended period of time before being vaporized. This may lead to an off-taste for the first puff, after a period of inactivity.

It would therefore be desirable to provide an aerosol-generating system, in which leakage of liquid aerosol-generating substrate is prevented or diminished. It would also be desirable to provide an aerosol-generating system, in which contamination of the system is prevented or diminished. It would also be desirable to provide an aerosol-generating system, in which unwanted off-tastes are prevented or diminished.

According to an embodiment of the invention there is provided an aerosol-generating system comprising a first air inlet and an air outlet. The aerosol-generating system may further comprise a liquid storage portion. The liquid storage portion may hold a liquid aerosol-forming substrate. The liquid storage portion may have a liquid outlet. The aerosol-generating system may further comprise an airflow passage from the first air inlet to the air outlet past the liquid outlet. The aerosol-generating system may further comprise a wick. The wick may be provided in the airflow passage. The wick may be arranged to receive liquid from the liquid storage portion in response to a pressure drop in the airflow passage at the liquid outlet. The aerosol-generating system may further comprise a first heating element positioned to heat the liquid in the wick. The wick may be arranged at a distance from the liquid outlet.

According to an embodiment of the invention there is provided an aerosol-generating system comprising a first air inlet and an air outlet. The aerosol-generating system further comprises a liquid storage portion. The liquid storage portion holds a liquid aerosol-forming substrate. The liquid storage portion has a liquid outlet. The aerosol-generating system further comprises an airflow passage from the first air inlet to the air outlet past the liquid outlet. The aerosol-generating system further comprises a wick. The wick is provided in the airflow passage. The wick is arranged to receive liquid from the liquid storage portion in response to a pressure drop in the airflow passage at the liquid outlet. The aerosol-generating system further comprises a first heating element positioned to heat the liquid in the wick. The wick is arranged at a distance from the liquid outlet.

The distance between the wick and the liquid outlet may be between 0.1 millimeter and 4 millimeters, preferably between 0.15 millimeter and 3.0 millimeters, and most preferably between 0.20 millimeter and 0.25 millimeter. The distance 'd' between the wick and the liquid outlet may be measured between a distal end of the wick and a proximal end of the liquid outlet.

The wick being arranged at a distance from the liquid outlet means that the wick may be spaced from the liquid outlet. The wick may be arranged not to contact the liquid outlet. The wick may be arranged contact free with respect to the liquid outlet. The wick may be arranged not to extend into the liquid storage portion. The wick may thus be arranged not to be in contact with the liquid being contained in the storage portion. Accordingly, in the absence of a pressure drop in the airflow passage at the liquid outlet, substantially no liquid is transported from the liquid storage portion to the wick. In the absence of a pressure drop in the airflow passage at the liquid outlet, liquid leakage out of the liquid storage portion is reduced or prevented.

A pressure drop in the airflow passage may be caused by a user drawing on the air outlet. The pressure drop may cause an airflow in the airflow passage. The pressure drop may thus cause liquid to be transported from the liquid storage portion to the wick past the liquid outlet via the airflow.

By the separation of the wick and the liquid storage portion, the wick may only absorb liquid from the airflow upon a user drawing on the air outlet. Absorption of liquid by the wick may be advantageously controlled. Also, surplus absorption of liquid by the wick may be reduced. Absorption of liquid by the wick during inactivity of the system may be reduced or avoided. Thereby, unwanted off-tastes may be prevented or diminished. Leakage of liquid aerosol-generating substrate may be prevented or diminished. Contamination of the system may thus be prevented or diminished.

The system may be adapted such that the liquid outlet of the liquid storage portion is closed in the absence of a pressure drop in the airflow passage. The liquid outlet of the liquid storage portion may open in response to a pressure drop in the airflow passage. This may enable liquid to be transported from the liquid storage portion to the wick. By opening the liquid outlet in response to a pressure drop, leakage of liquid from the liquid storage portion during inactivity of the system may be advantageously avoided. By opening the liquid outlet in response to a pressure drop, absorption of liquid by the wick during inactivity of the system may be advantageously avoided.

The liquid storage portion may comprise a one-way valve at the liquid outlet. The one-way valve may open in response to a pressure drop in the airflow passage allowing liquid to be transported from the liquid storage portion to the wick. The one-way valve may further prevent contamination of the liquid storage portion by hindering any residues from entering into the liquid storage portion via the liquid outlet.

The airflow passage extends from the first air inlet to the air outlet past the liquid outlet of the liquid storage portion. By "past the liquid outlet" it is meant that a portion of the airflow passage is directly adjacent to the liquid outlet. At least a portion of an airflow passing the airflow passage is guided over the liquid outlet. The airflow may take up liquid droplets exiting the liquid storage portion via the liquid outlet.

The airflow passage may extend through the liquid storage portion and through the liquid outlet. The airflow through the liquid storage portion may promote liquid droplets to exit the liquid storage portion via the liquid outlet.

The liquid storage portion may comprise a storage portion air inlet. The airflow passage may extend from the first air inlet to the air outlet past the storage portion air inlet and past the liquid outlet. Ambient air may enter the airflow passage via the first air inlet when a user draws on the air outlet. The air may enter the liquid storage portion via the storage portion air inlet. The air may then travel through the liquid storage portion and exit the liquid storage portion at the liquid outlet. Thereby, liquid may be driven through the liquid outlet out of the liquid storage portion and onto the wick.

The aerosol-generating system may further comprise a second air inlet that is fluidly connected to the storage portion air inlet. An additional storage portion airflow passage may extend from the second air inlet to the storage portion air inlet. Ambient air may enter the storage portion airflow passage via the second air inlet when a user draws on the air outlet. The air may enter the liquid storage portion via the storage portion air inlet. The air may then travel through the liquid storage portion and exit the liquid storage portion at the liquid outlet. The storage portion airflow passage and the airflow passage may combine past the liquid outlet. Thereby, liquid may be driven through the liquid outlet out of the liquid storage portion and onto the wick.

In embodiments comprising the first air inlet and the second air inlet and the storage portion air inlet, the airflow passage does not necessarily have to extend from the first air inlet to the air outlet past the storage portion air inlet and past the liquid outlet. In some embodiments, the airflow passage extends from the second air inlet via the additional storage portion airflow passage to the air outlet past the storage portion air inlet and past the liquid outlet, and the airflow passage extending from the first air inlet to the air outlet does not travel through the liquid storage portion. In embodiments comprising the first air inlet and the second air inlet and the storage portion air inlet, an airflow passage extending from the second air inlet to the air outlet past the storage portion air inlet and past the liquid outlet may be present instead of the airflow passage extending from the first air inlet to the air outlet past the storage portion air inlet and past the liquid outlet.

The liquid storage portion may comprise a liquid storage portion air inlet and the liquid storage portion may comprise a one-way valve at the liquid storage portion air inlet. The one-way valve may open in response to a pressure drop in the airflow passage allowing ambient air to enter the liquid storage portion. The one-way valve may further prevent leakage of liquid out of the liquid storage portion air inlet by hindering any liquids from exiting the liquid storage portion via the liquid storage portion air inlet. Herein, the terms 'liquid storage portion air inlet' and 'storage portion air inlet' are used synonymously.

The system may be configured to removably receive the liquid storage portion. Thereby, the liquid storage portion may be easily replaced by the user. The user may replace an emptied liquid storage portion. The user may select between different liquid storage portions holding different liquids. The different liquid storage portions may be colour coded with different colours such that the user may easily distinguish between the different liquid storage portions. The system may be used without a liquid storage portion being inserted.

The aerosol-generating system may further comprise a cavity for receiving an aerosol-generating article comprising a solid aerosol-forming substrate.

The cavity of the aerosol-generating system may have an open end into which the aerosol-generating article is inserted. The open end may be a proximal end. The cavity may have a closed end opposite the open end. The closed end may be the base of the cavity. The closed end may be closed except for the provision of air apertures arranged in the base. The base of the cavity may be flat. The base of the cavity may be circular. The base of the cavity may be arranged upstream of the cavity. The open end may be arranged downstream of the cavity. The cavity may have an elongate extension. The cavity may have a longitudinal central axis. A longitudinal direction may be the direction extending between the open and closed ends along the longitudinal central axis. The longitudinal central axis of the cavity may be parallel to the longitudinal axis of the aerosol-generating system.

The cavity may be configured as a heating chamber. The cavity may have a cylindrical shape. The cavity may have a hollow cylindrical shape. The cavity may have a shape corresponding to the shape of the aerosol-generating article to be received in the cavity. The cavity may have a circular cross-section. The cavity may have an elliptical or rectangular cross-section. The cavity may have an inner diameter corresponding to the outer diameter of the aerosol-generating article.

The cavity may be adapted such that air may flow through the cavity. The liquid storage portion may be fluidly connected with the cavity via the airflow passage. The airflow passage may extend from the air inlet to the air outlet past the liquid outlet and the cavity. Ambient air may be drawn into the aerosol-generating system, into the cavity and towards the user. The open end of the cavity may comprise the air outlet. Downstream of the cavity, a mouthpiece may be arranged or a user may directly draw on the aerosol-generating article. The airflow pathway may extend through the mouthpiece.

The aerosol-generating system may further comprise a second heating element arranged in the cavity for heating the solid aerosol-forming substrate.

The aerosol-generating system may further comprise a mouth-end portion and a main body, wherein the cavity is provided in the mouth-end portion, and wherein the liquid storage portion is arranged between the mouth-end portion and the main body. Thereby, a modular aerosol-generating system enabling different modes of operation, for example three different modes of operation, may be provided. A user may choose between the different modes of operation. Thus, it is not necessary for a user to carry multiple different systems for each mode of operation, but only one system.

Also, a user may not need to buy multiple different systems, but only one system, which may be cost saving.

According to a first mode of operation the liquid storage portion is received in the aerosol-generating system and, additionally, an aerosol-generating article is received in the cavity. Therefore, an inhalable aerosol may contain substances which are derived from the liquid storage portion and, additionally, substances derived from the aerosol-forming substrate comprised in the aerosol-generating article.

According to a second mode of operation, the liquid storage portion is not received in the aerosol-generating system and the distal end of the mouth-end portion is directly removably attached to the proximal end of the main body. Further, an aerosol-generating article is received in the cavity. Therefore, an inhalable aerosol may contain substances derived from the aerosol-forming substrate comprised in the aerosol-generating article, only.

According to a third mode of operation, the liquid storage portion is received in the aerosol-generating system, but no aerosol-generating article is received in the cavity. Optionally, a mouthpiece may be attached onto the open end of the cavity. Therefore, an inhalable aerosol may contain substances which are derived from the liquid storage portion, only.

The aerosol-generating system may comprise a power supply for powering the first heating element. The aerosol-generating system may comprise a power supply for powering both the first and second heating element. The main body may comprise a power supply for powering the first heating element. The main body may comprise a power supply for powering both the first and second heating element.

The power supply may comprise a battery. The power supply may be a lithium-ion battery. The power supply may be a nickel-metal hydride battery, a nickel cadmium battery, or a lithium-based battery, for example a lithium-cobalt, a lithium-iron-phosphate, lithium titanate or a lithium-polymer battery. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to provide a predetermined number of puffs or discrete activations of the heating element.

The power supply may be a direct current (DC) power supply. In one embodiment, the power supply is a DC power supply having a DC supply voltage in the range of 2.5 Volts to 4.5 Volts and a DC supply current in the range of 1 Amp to 10 Amps (corresponding to a DC power supply in the range of 2.5 Watts to 45 Watts). The aerosol-generating system may advantageously comprise a direct current to alternating current (DC/AC) inverter for converting a DC current supplied by the DC power supply to an alternating current. The DC/AC converter may comprise a Class-D, Class-C or Class-E power amplifier. The AC power output of the DC/AC converter is supplied to the induction coil.

The power supply may be adapted to power an induction coil and may be configured to operate at high frequency. A Class-E power amplifier is preferable for operating at high frequency. As used herein, the term 'high frequency oscillating current' means an oscillating current having a frequency of between 500 kilohertz and 30 megahertz. The high frequency oscillating current may have a frequency of from 1 megahertz to 30 megahertz, preferably from 1 megahertz to 10 megahertz, and more preferably from 5 megahertz to 8 megahertz.

In another embodiment the switching frequency of the power amplifier may be in the lower kHz range, e.g. between 100 kHz and 400 KHz. In the embodiments, where a Class-D or Class-C power amplifier is used, switching frequencies in the lower kHz range are particularly advantageous.

The following examples and features concerning the heating element may apply to one or both of the first and second heating element. The heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

The heating element advantageously heats the aerosol-forming substrate by means of heat conduction. The heating element may be at least partially in contact with the substrate, or the carrier on which the substrate is deposited. The heat from either an internal or external heating element may be conducted to the substrate by means of a heat conductive element.

During operation, the aerosol-forming substrate may be completely contained within the aerosol-generating system. In that case, a user may puff on a mouthpiece of the aerosol-generating system. During operation, a smoking article containing the aerosol-forming substrate may be partially contained within the aerosol-generating system. In that case, the user may puff directly on the smoking article.

The heating element may be part of an induction heating arrangement. The induction heating arrangement may be configured to generate heat by means of induction. The induction heating arrangement may comprise an induction coil and a susceptor arrangement. A single induction coil may be provided. A single susceptor arrangement may be provided. Preferably, more than a single induction coil is provided. A first induction coil and a second induction coil may be provided. Preferably, more than a single susceptor arrangement is provided. The induction heating arrangement may comprise a central susceptor arrangement and a peripheral susceptor arrangement. The induction coil may surround both the central susceptor arrangement and the peripheral susceptor arrangement. The first induction coil may surround a first region of the central and peripheral susceptor arrangements. The second induction coil may surround a second region of the central and peripheral susceptor arrangements. A region surrounded by an induction coil may be configured as a heating zone as described in more detail below.

The aerosol-generating system may comprise a flux concentrator. The flux concentrator may be made from a material having a high magnetic permeability. The flux concentrator may be arranged surrounding the induction heating arrangement. The flux concentrator may concentrate the magnetic field lines to the interior of the flux concentrator thereby increasing the heating effect of the susceptor arrangement by means of the induction coil, and prevent the alternating magnetic field from the inductor to interfere with other devices in the surroundings.

The aerosol-generating system may comprise a controller. The controller may be electrically connected to the induction coil. The controller may be electrically connected to the first induction coil and to the second induction coil. The controller may be configured to control the electrical current supplied to the induction coil(s), and thus the magnetic field strength generated by the induction coil(s).

The power supply and the controller may be connected to the induction coil.

The controller may be configured to be able to chop the current supply on the input side of the DC/AC converter. This way the power supplied to the induction coil may be controlled by conventional methods of duty-cycle management.

The first heating element may be provided in the mouth-end portion. The second heating element may be provided in the mouth-end portion. Both the first and second heating element may be provided in the mouth-end portion.

The first air inlet may be provided in the mouth-end portion.

The second air inlet may be provided in the main body.

The wick may be capable of absorbing liquid from the airflow. The wick may comprise a capillary material. The capillary material may have a fibrous or spongy structure. The capillary material preferably comprises a bundle of capillaries. For example, the capillary material may comprise a plurality of fibres or threads or other fine bore tubes. The fibres or threads may be generally aligned to convey liquid to the heater. The capillary material may comprise sponge-like or foam-like material. The structure of the capillary material forms a plurality of small bores or tubes, through which the liquid can be transported by capillary action. The capillary material may comprise any suitable material or combination of materials. Examples of suitable materials are a sponge or foam material, ceramic- or graphite-based materials in the form of fibres or sintered powders, foamed metal or plastics materials, a fibrous material, for example made of spun or extruded fibres, such as cellulose acetate, polyester, or bonded polyolefin, polyethylene, ethylene or polypropylene fibres, nylon fibres or ceramic. The capillary material may have any suitable capillarity and porosity so as to be used with different liquid physical properties. The liquid has physical properties, including but not limited to viscosity, surface tension, density, thermal conductivity, boiling point and vapour pressure, which allow the liquid to be transported through the capillary material by capillary action. The capillary material may be configured to convey the aerosol-forming substrate to the heating element. The capillary material may extend into interstices in the heating element.

The first heating element may be part of an induction heating arrangement comprising a susceptor arrangement. The first heating element may comprise a susceptor material, which heats in response to an alternating magnetic field generated by an inductor arranged in the aerosol-generating system. The inductor may be an induction coil. The inductor may be a helical coil that surrounds the first heating element.

The second heating element may be part of an induction heating arrangement comprising a susceptor arrangement. The second heating element may comprise a susceptor material, which heats in response to an alternating magnetic field generated by an inductor arranged in the aerosol-generating system. The inductor may be an induction coil. The inductor may be a helical coil that surrounds the second heating element.

Both the first and second heating element may be part of an induction heating arrangement. Both the first and second heating element may comprise a susceptor material, which heats in response to an alternating magnetic field generated by an inductor arranged in the aerosol-generating system. The inductor may be one or more helical coil(s) that surround(s) both the first and the second heating element.

The first heating element may comprise a central susceptor arrangement comprising the susceptor material and being arranged centrally within the cavity. The second heating element may comprise a peripheral susceptor arrangement comprising the susceptor material and being arranged distanced from and around the central susceptor arrangement.

The central susceptor arrangement may comprise a central susceptor. The central susceptor arrangement may comprise at least two central susceptors. The central susceptor arrangement may comprise more than two central susceptors. The central susceptor arrangement may comprise four central susceptors. The central susceptor arrangement may consist of four central susceptors. At least one of, preferably all, of the central susceptor(s) may be elongate.

The central susceptor may be arranged parallel to the longitudinal central axis of the cavity. If multiple central susceptors are provided, each central susceptor may be arranged equidistant parallel to the longitudinal central axis of the cavity.

A downstream end portion of the central susceptor arrangement may be rounded, preferably bend inwards towards the central longitudinal axis of the cavity. A downstream end portion of the central susceptor may be rounded, preferably bend inwards towards the central longitudinal axis of the cavity. If multiple central susceptors are provided, preferably each downstream end portion of each central susceptor may be rounded, preferably bend inwards towards the central longitudinal axis of the cavity. The rounded end portion may facilitate insertion of the aerosol-generating article over the central susceptor arrangement. Alternatively to a rounded end portion, the end portion may be tapered or chamfered towards the longitudinal central axis of the cavity.

The central susceptor arrangement may be arranged around the central longitudinal axis of the cavity. If multiple central susceptors are provided, the central susceptors may be arranged in a ring-shaped orientation around the central longitudinal axis of the cavity. When the aerosol-generating article is inserted into the cavity, the aerosol-generating article may be centred in the cavity by means of the arrangement of the central susceptor arrangement.

The central susceptor arrangement may be hollow. The central susceptor arrangement may comprise at least two central susceptors defining a hollow cavity between the central susceptors. The hollow configuration of the central susceptor arrangement may enable airflow into the hollow central susceptor arrangement. The airflow passage may extend through the hollow central susceptor arrangement. The wick may be provided within the hollow central susceptor arrangement. As described herein, preferably the central susceptor arrangement comprises at least two central susceptors. Preferably, gaps are provided between the at least two central susceptors. As a consequence, airflow may be enabled through the central susceptor arrangement. The airflow may be enabled in a direction parallel or along the longitudinal central axis of the cavity. Preferably, by means of the gap, airflow may be enabled in a lateral direction. Lateral airflow may enable aerosol generation due to contact between the incoming air and the aerosol-generating substrate of the aerosol-generating article through the gaps between the central susceptors. Heating of the central susceptor arrangement may lead to heating of the wick within the hollow central susceptor arrangement. Heating of the wick may lead to aerosol generation within the hollow central susceptor arrangement. Heating of the central susceptor arrangement, when the aerosol-generating article is inserted into the cavity, may lead to aerosol generation within the hollow central susceptor arrangement. The central susceptor arrangement may be configured to heat the inside of the aerosol-generating article. The aerosol may be drawn in a downstream direction through the hollow central susceptor arrangement.

The central susceptor arrangement may have a ring-shaped cross-section. The central susceptor arrangement may comprise at least two central susceptors defining a hollow cavity with a ring-shaped cross-section. The central susceptor arrangement may be tubular. If the central susceptor arrangement comprises at least two central susceptors, the central susceptors may be arranged to form the tubular central susceptor arrangement. Preferably, airflow is enabled through the central susceptor arrangement through gaps between the central susceptors.

The peripheral susceptor arrangement may comprise an elongate, preferably blade-shaped susceptor, or a cylinder-shaped susceptor. The peripheral susceptor arrangement may comprise at least two blade-shaped susceptors. The blade-shaped susceptors may be arranged surrounding the cavity. The blade-shaped susceptors may be arranged parallel to the longitudinal central axis of the cavity. The blade-shaped susceptors may be arranged inside of the cavity. The blade-shaped susceptors may be arranged for holding the aerosol-generating article, when the aerosol-generating article is inserted into the cavity. The blade-shaped susceptors may have flared downstream ends to facilitate insertion of the aerosol-generating article into the blade shaped susceptors. Air may flow into the cavity between the blade-shaped susceptors. Gaps may be provided between individual blade-shaped susceptors. The air may subsequently contact or enter into the aerosol-generating article. A uniform penetration of the aerosol-generating article with air may be achieved in this way, thereby optimizing aerosol generation. The peripheral susceptor arrangement may be configured to heat the outside of the aerosol-generating article.

The peripheral susceptor arrangement may comprise at least two peripheral susceptors. The peripheral susceptor arrangement may comprise multiple peripheral susceptors. At least one of, preferably all of, the peripheral susceptors may be elongate. At least one of, preferably all of, the peripheral susceptors may be blade-shaped.

A downstream end portion of the peripheral susceptor arrangement may be flared. At least one of, preferably all of, the peripheral susceptors may have flared downstream end portions.

The peripheral susceptor arrangement may be arranged around the central longitudinal axis of the cavity. The peripheral susceptor arrangement may be arranged around the central susceptor arrangement. If the peripheral susceptor arrangement comprises multiple peripheral susceptors, each peripheral susceptor may be arranged equidistant parallel to the central longitudinal axis of the cavity.

The peripheral susceptor arrangement may define an annular hollow cylinder-shaped cavity between the peripheral susceptor arrangement and the central susceptor arrangement. The annular hollow cylinder-shaped cavity may be the cavity for insertion of the aerosol-generating article. The central susceptor arrangement may be arranged in the annular hollow cylinder-shaped cavity. The annular hollow cylinder-shaped cavity may be configured to receive the aerosol-generating article.

The peripheral susceptor may have a ring-shaped cross-section. The peripheral susceptor arrangement may comprise at least two peripheral susceptors defining a hollow cavity with a ring-shaped cross section. The peripheral susceptor arrangement may be tubular.

The peripheral susceptor arrangement may have an inner diameter larger than an outer diameter of the central susceptor arrangement. Between the peripheral susceptor arrangement and the central susceptor arrangement, the annular hollow cylinder-shaped cavity may be arranged.

The central susceptor arrangement and the peripheral susceptor arrangement may be coaxially arranged.

As used herein, the term 'aerosol-forming substrate' relates to a substrate capable of releasing volatile compounds that can form an aerosol. Such volatile compounds may be released by heating the aerosol-forming substrate. The aerosol-forming substrate may be in solid form or may be in liquid form.

The aerosol-forming substrate may be part of an aerosol-generating article. The aerosol-forming substrate may be part of the liquid held in the liquid storage portion. The liquid storage portion may contain a liquid aerosol-forming substrate. The liquid storage portion may contain a solid aerosol-forming substrate. The liquid storage portion may contain both a liquid aerosol-forming substrate and a solid aerosol-forming substrate. For example, the liquid storage portion may contain a suspension of a solid aerosol-forming substrate and a liquid. Preferably, the liquid storage portion contains a liquid aerosol-forming substrate.

The aerosol-forming substrate described in the following may be one or both of the aerosol-forming substrate contained in the liquid storage portion and the aerosol-forming substrate comprised in the aerosol-generating article. Preferably, a liquid nicotine or flavor/flavorant containing aerosol-forming substrate may be employed in the liquid storage portion, while a solid tobacco containing aerosol-forming substrate may be employed in the aerosol-generating article.

The aerosol-forming substrate may comprise nicotine. The nicotine-containing aerosol-forming substrate may be a nicotine salt matrix.

The aerosol-forming substrate may comprise plant-based material. The aerosol-forming substrate may comprise tobacco. The aerosol-forming substrate may comprise a tobacco-containing material including volatile tobacco flavor compounds which are released from the aerosol-forming substrate upon heating. Alternatively, the aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate may comprise a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1, 3-butanediol. Preferably, the aerosol former is glycerine. Where present, the homogenised tobacco material may have an aerosol-former content of equal to or greater than 5 percent by weight on a dry weight basis, and preferably from 5 percent to 30 percent by weight on a dry weight basis. The aerosol-forming substrate may comprise other additives and ingredients, such as flavourants.

As used herein, the term 'aerosol-generating article' refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. The aerosol-generating article may be insertable into the cavity of the aerosol-generating system.

The aerosol-generating article and the cavity of the aerosol-generating system may be arranged such that the aerosol-generating article is partially received within the cavity of the aerosol-generating system. The cavity of the aerosol-generating system and the aerosol-generating article may be arranged such that the aerosol-generating article is entirely received within the cavity of the aerosol-generating system.

The aerosol-generating article may have a length and a circumference substantially perpendicular to the length. The aerosol-forming substrate may be provided as an aerosol-forming segment containing an aerosol-forming substrate. The aerosol-forming segment may be substantially cylindrical in shape. The aerosol-forming segment may be substantially elongate. The aerosol-forming segment may also have a length and a circumference substantially perpendicular to the length.

As used herein, the term 'liquid storage portion' refers to a storage portion comprising a liquid aerosol-forming substrate that is capable of releasing volatile compounds that can form an aerosol. The liquid storage portion may be configured as a container or a reservoir for storing the liquid aerosol-forming substrate.

The liquid storage portion may be arranged permanently in the aerosol-generating system. The liquid storage portion may be refillable. The liquid storage portion may be part of or configured as a replaceable cartridge, tank or container. The liquid storage portion may be any suitable shape and size. For example, the liquid storage portion may be substantially cylindrical. The cross-section of the liquid storage portion may, for example, be substantially circular, elliptical, square or rectangular.

The liquid storage portion may comprise a housing. The housing may comprise a base and one or more sidewalls extending from the base. The base and the one or more sidewalls may be integrally formed. The base and one or more sidewalls may be distinct elements that are attached or secured to each other. The housing of the liquid storage portion may comprise a transparent or a translucent portion, such that liquid aerosol-forming substrate stored in the liquid storage portion may be visible to a user through the housing. The liquid storage portion may be configured such that aerosol-forming substrate stored in the liquid storage portion is protected from ambient air. The liquid storage portion may be configured such that aerosol-forming substrate stored in the liquid storage portion is protected from light. This may reduce the risk of degradation of the substrate and may maintain a high level of hygiene.

As used herein, the term 'aerosol-generating system' refers to a system that utilizes liquid aerosol-forming substrate held in the liquid storage portion to generate an aerosol or interacts with an aerosol-generating article to generate an aerosol, or both utilizes liquid aerosol-forming substrate and interacts with an aerosol-generating article to generate an aerosol.

The aerosol-generating system may comprise a thermally insulating element. The thermally insulating element may be arranged surrounding the cavity. The thermally insulating element may be arranged between a housing of the aerosol-generating system and the cavity. The thermally insulating element may be tubular. The thermally insulating element may be coaxially aligned with the induction heating arrangement, preferably coaxially aligned with the peripheral susceptor arrangement.

Preferably, the aerosol-generating system is portable. The aerosol-generating system may have a size comparable to a conventional cigar or cigarette. The system may be an electrically operated smoking system. The system may be a handheld aerosol-generating system. The aerosol-generating system may have a total length between 30 millimetres and 150 millimetres. The aerosol-generating system may have an external diameter between 5 millimetres and 30 millimetres.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The housing may comprise at least one air inlet. The housing may comprise more than one air inlet.

As used herein, the term 'mouthpiece' refers to a portion of an aerosol-generating system that is placed into a user's mouth in order to directly inhale an aerosol generated by the aerosol-generating system from an aerosol-generating article received in the cavity of the system and/or from the liquid received by the wick.

Operation of the heating arrangement may be triggered by a puff detection system.

Operation of the heating arrangement may be triggered by pressing an on-off button, held for the duration of the user's puff. The puff detection system may be provided as a sensor, which may be configured as an airflow sensor to measure the airflow rate. The airflow rate is a parameter characterizing the amount of air that is drawn through the airflow path of the aerosol-generating system per time by the user. The initiation of the puff may be detected by the airflow sensor when the airflow exceeds a predetermined threshold. Initiation may also be detected upon a user activating a button.

The sensor may also be configured as a pressure sensor. When the user draws on the aerosol-generating system, a negative pressure or vacuum is generated inside the system, wherein the negative pressure may be detected by the pressure sensor. The term "negative pressure" is to be understood as a pressure which is lower than the pressure of ambient air. In other words, when the user draws on the system, the air which is drawn through the system has a pressure which is lower than the pressure off ambient air outside of the system.

The aerosol-generating system may include a user interface to activate the aerosol-generating system, for example a button to initiate heating of the aerosol-generating system or a display to indicate a state of the aerosol-generating system or of the aerosol-forming substrate.

The aerosol-generating system may include additional components, such as, for example a charging unit for recharging an on-board electric power supply in an electrically operated or electric aerosol-generating system.

As used herein, the term 'proximal' refers to a user-end, or mouth-end of the aerosol-generating system or a part or portion thereof, and the term 'distal' refers to the end opposite to the proximal end. When referring to the cavity, the term 'proximal' refers to the region closest to the open end of the cavity and the term 'distal' refers to the region closest to the closed end.

As used herein, the terms 'upstream' and 'downstream' are used to describe the relative positions of components, or portions of components, of the aerosol-generating system in relation to the direction in which a user draws on the aerosol-generating system during use thereof.

As used herein, a 'susceptor arrangement' means an element that heats up when subjected to an alternating magnetic field. This may be the result of eddy currents induced in the susceptor arrangement, hysteresis losses, or both eddy currents and hysteresis losses. During use, the susceptor arrangement is located in thermal contact or close thermal proximity with an aerosol-forming substrate received in the aerosol-generating system. In this manner, the aerosol-forming substrate is heated by the susceptor arrangement such that an aerosol is formed.

The susceptor material may be any material that can be inductively heated to a temperature sufficient to aerosolize an aerosol-forming substrate. The following examples and features concerning the susceptor arrangement may apply to one or both of the central susceptor arrangement and the peripheral susceptor arrangement. Suitable materials for the susceptor material include graphite, molybdenum, silicon carbide, stainless steels, niobium, aluminium, nickel, nickel containing compounds, titanium, and composites of metallic materials. Preferred susceptor materials comprise a metal or carbon. Advantageously the susceptor material may comprise or consists of a ferromagnetic or ferri-magnetic material, for example, ferritic iron, a ferromagnetic alloy, such as ferromagnetic steel or stainless steel, ferromagnetic particles, and ferrite. A suitable susceptor material may be, or comprise, aluminium. The susceptor material may comprise more than 5 percent, preferably more than 20 percent, more preferably more than 50 percent, or more than 90 percent of ferromagnetic, ferri-magnetic or paramagnetic materials. Preferred susceptor materials may be heated to a temperature in excess of 250 degrees Celsius without degradation.

The susceptor material may be formed from a single material layer. The single material layer may be a steel layer.

The susceptor material may comprise a non-metallic core with a metal layer disposed on the non-metallic core. For example, the susceptor material may comprise metallic tracks formed on an outer surface of a ceramic core or substrate.

The susceptor material may be formed from a layer of austenitic steel. One or more layers of stainless steel may be arranged on the layer of austenitic steel. For example, the susceptor material may be formed from a layer of austenitic steel having a layer of stainless steel on each of its upper and lower surfaces. The susceptor arrangement may comprise a single susceptor material. The susceptor arrangement may comprise a first susceptor material and a second susceptor material. The first susceptor material may be disposed in intimate physical contact with the second susceptor material. The first and second susceptor materials may be in intimate contact to form a unitary susceptor. In certain embodiments, the first susceptor material is stainless steel and the second susceptor material is nickel. The susceptor arrangement may have a two-layer construction. The susceptor arrangement may be formed from a stainless steel layer and a nickel layer.

Intimate contact between the first susceptor material and the second susceptor material may be made by any suitable means. For example, the second susceptor material may be plated, deposited, coated, clad or welded onto the first susceptor material. Preferred methods include electroplating, galvanic plating and cladding.

Features described in relation to one embodiment may equally be applied to other embodiments of the invention.

Below, there is provided a non-exhaustive list of non-limiting examples. Any one or more of the features of these examples may be combined with any one or more features of another example or embodiment described herein.

Example A: An aerosol-generating system comprising:

a first air inlet and an air outlet, a liquid storage portion holding a liquid aerosol-forming substrate, the liquid storage portion having a liquid outlet, an airflow passage from the first air inlet to the air outlet past the liquid outlet, a wick in the airflow passage arranged to receive liquid from the liquid storage portion in response to a pressure drop in the airflow passage at the liquid outlet, and a first heating element positioned to heat the liquid in the wick, wherein the wick is arranged at a distance from the liquid outlet.

Example B: The aerosol-generating system according to Example A, wherein the liquid outlet of the liquid storage portion opens in response to a pressure drop in the airflow passage.

Example C: The aerosol-generating system according to Example A or B, wherein the liquid storage portion further comprises a storage portion air inlet.

Example D: The aerosol-generating system according to Example 1, 2 or 3, further being configured to removably receive the liquid storage portion.

Example E: The aerosol-generating system according to any of the preceding examples, wherein the aerosol-generating system further comprises a cavity for receiving an aerosol-generating article comprising a solid aerosol-forming substrate.

Example F: The aerosol-generating system according to Example E, further comprising a second heating element arranged in the cavity for heating the solid aerosol-forming substrate.

Example G: The aerosol-generating system according to Example E or F, wherein the aerosol-generating system further comprises a mouth-end portion and a main body, wherein the cavity is provided in the mouth-end portion, and wherein the liquid storage portion is arranged between the mouth-end portion and the main body.

Example H: The aerosol-generating system according to Example G, wherein the main body comprises a power supply for powering both the first and second heating element.

Example I: The aerosol-generating system according to Example G or H, wherein the first heating element is provided in the mouth-end portion.

Example J: The aerosol-generating system according to any of Examples G to I, wherein the first air inlet is provided in the mouth-end portion.

Example K: The aerosol-generating system according to any of Examples C to J, further comprising a second air inlet that is fluidly connected to the storage portion air inlet.

Example L: The aerosol-generating system according to Example K and Example G, wherein the second air inlet is arranged in the main body.

Example M: The aerosol-generating system according to any of the preceding examples, wherein the first heating element comprises a susceptor material, which heats in response to an alternating magnetic field generated by an inductor arranged in the aerosol-generating system.

Example N: The aerosol-generating system according to any of Examples F to M, wherein the second heating element comprises a susceptor material, which heats in response to an alternating magnetic field generated by an inductor arranged in the aerosol-generating system.

Example O: The aerosol generating system according to claim Examples M and N, wherein the inductor is a helical coil that surrounds both the first and the second heating element.

The invention will be further described, by way of example only, with reference to the accompanying drawings in which:

FIG. 1 schematically illustrates an aerosol-generating system according to an embodiment of the invention;

Figure 1:
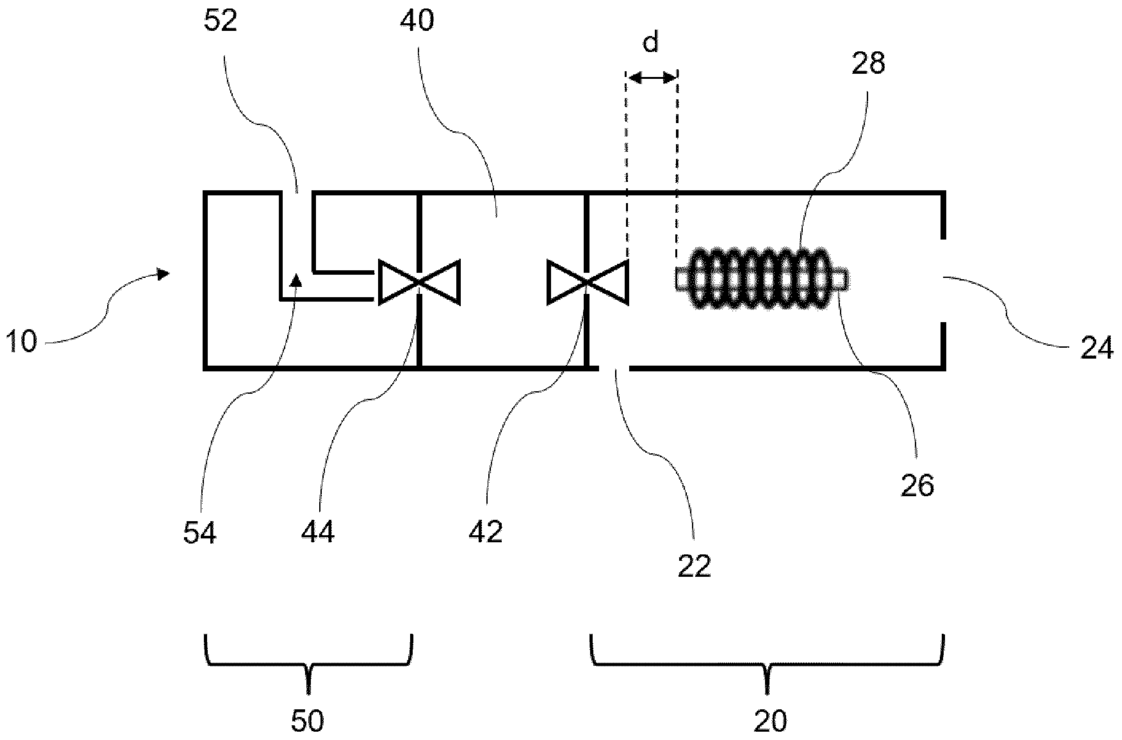

FIG. 1 schematically shows an embodiment of an aerosol-generating system 10 of the invention. The system 10 comprises a mouth-end portion 20, a liquid storage portion 40, and a main body 50. The mouth-end portion 20 comprises a first air inlet 22 and an air outlet 24.

The liquid storage portion 40 holds a liquid aerosol-forming substrate. The liquid storage portion comprises a liquid outlet 42. An airflow passage extends from the first air inlet 22 to the air outlet 24 past the liquid outlet 42. The liquid storage portion 40 is fluidly connected with the airflow passage. The liquid outlet 42 of the liquid storage portion 40 opens in response to a pressure drop in the airflow passage, which is caused by a user puffing on the mouth-end portion at the air outlet 24. The liquid outlet 42 comprises a one-way valve to open in a direction from the liquid storage portion 40 towards the air outlet 24. The liquid storage portion 40 further comprises a storage portion air inlet 44.

The mouth-end portion 20 further comprises a wick 26 in the airflow passage arranged to receive liquid from the liquid storage portion 40 in response to a pressure drop in the airflow passage at the liquid outlet 42. The illustrated mouth-end portion 20 also comprises a first heating element 28 positioned to heat the liquid in the wick 26. The wick 26 is arranged at a distance d from the liquid outlet 42. In the embodiment of FIG. 1, the distance d between the wick 26 and the liquid outlet 42 is measured between a distal end of the wick 26 and a proximal end of the liquid outlet 42.

In the embodiment shown in FIG. 1, the first heating element is schematically illustrated as a coil which is wound around the wick 26. However, the first heating element may as well be of a different shape. The heating element 28 may be a resistively heated coil on a wick, but it may also be an inductively heated susceptor element, which heats up when penetrated by an alternating magnetic field that may be generated by an inductor coil (not illustrated).

The main body 50 comprises a second air inlet 52 that is fluidly connected to the storage portion air inlet 44 via a storage portion airflow passage 54. Thereby, an additional airflow through the liquid storage portion may be provided. Extraction of liquid from the liquid storage portion 40 via the liquid outlet 42 may be advantageously promoted.

The storage portion air inlet 44 opens in response to a pressure drop in the airflow passage extending from the first air inlet 22 to the air outlet 24 past the liquid outlet 42, thereby allowing air to flow from the second air inlet 52, through the storage portion airflow passage 54 and into the liquid storage portion 40, when a user puffs on the mouth-end portion 20 and therefore extracts liquid from the liquid storage portion 40 that is caught by the wick 26 due to the puffing action of the user. The storage portion air inlet 44 comprises a one-way valve to open in a direction from the second air inlet 52 towards the liquid storage portion 40.

Figure 2:
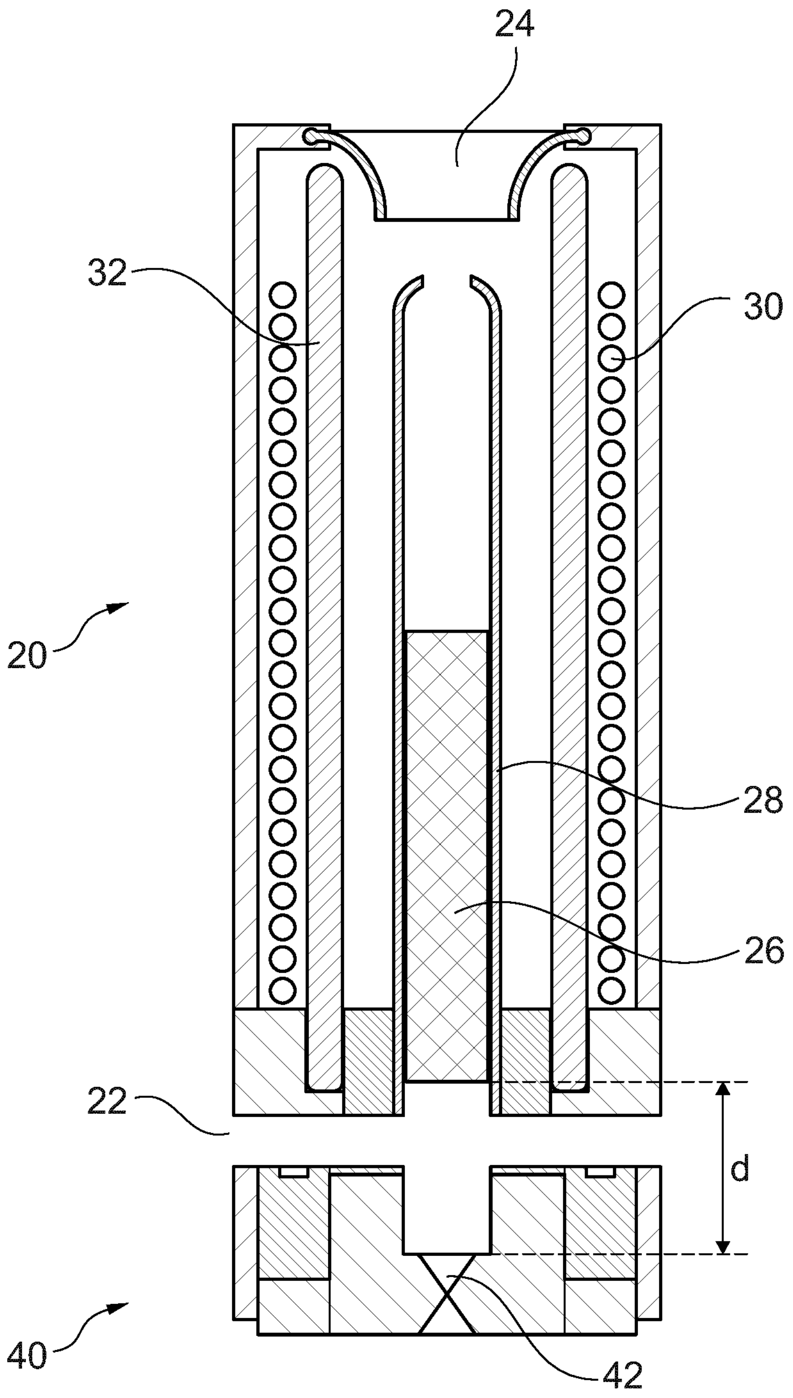
FIG. 2 shows a cross-sectional view of mouth-end portion with proximal part of liquid storage portion of an embodiment of an aerosol-generating system of the invention.

FIG. 2 shows a cross-sectional view of mouth-end portion 20 and a proximal part of liquid storage portion 40 of an embodiment of an aerosol-generating system 10 of the invention. In the embodiment of FIG. 2, the first heating element 28 is provided in the mouth-end portion 20. The first heating element 28 comprises a susceptor material, which heats in response to an alternating magnetic field generated by an inductor 30 arranged in the aerosol-generating system 10. The inductor 30 is in the illustrated embodiment a helical coil that surrounds the first heating element 28. Also shown is a thermal insulator 32 positioned between the helical coil of the inductor 30 and the first heating element 28. The first heating element 28 further surrounds a wick 26. The wick 26 is arranged within the first heating element 28, and is in thermal contact with the first heating element 28. The first heating element 28 is thus positioned to heat the liquid in the wick 26. The illustrated heating element 28 may also be comprised of an assembly of longitudinal susceptor elements extending along the wick 26, where there is provided an air-gap between neighbouring susceptor elements.

Also shown in FIG. 2 is a proximal part of the liquid storage portion 40 being attached to the mouth-end portion 20. In the embodiment shown, the liquid storage portion 40 comprises a one-way valve at the liquid outlet 42. The wick 26 is arranged at a distance d from the liquid outlet 42. In the embodiment of FIG. 2, the distance d between the wick 26 and the liquid outlet 42 is measured between a distal end of the wick 26 and a proximal end of the liquid outlet 42. An airflow passage extends from the first air inlet 22 to the air outlet 24 past the liquid outlet 42. In response to a pressure drop in the airflow passage due to a user puffing on the mouth-end portion 20 at the air outlet 24 or on a mouthpiece (not shown), an airflow along the airflow passage from the air inlet 22 to through the air outlet 24 will result. Further, the liquid outlet 42 of the liquid storage portion 40 opens in response to the pressure drop in the airflow passage. Accordingly, the airflow in the airflow passage picks up droplets of liquid exiting the liquid outlet 42. The droplets are then transported from the liquid outlet 42 to the wick 26 via the airflow in the airflow passage. When the liquid is soaked in the wick 26, it is heated and volatilized. This volatilized liquid forms a super-saturated vapour-air mix that is allowed to cool down on its way towards the air outlet 24. During this cooling down of the vapour-air mix, aerosol is formed that is inhaled by a user performing the puffing.

Figure 3:
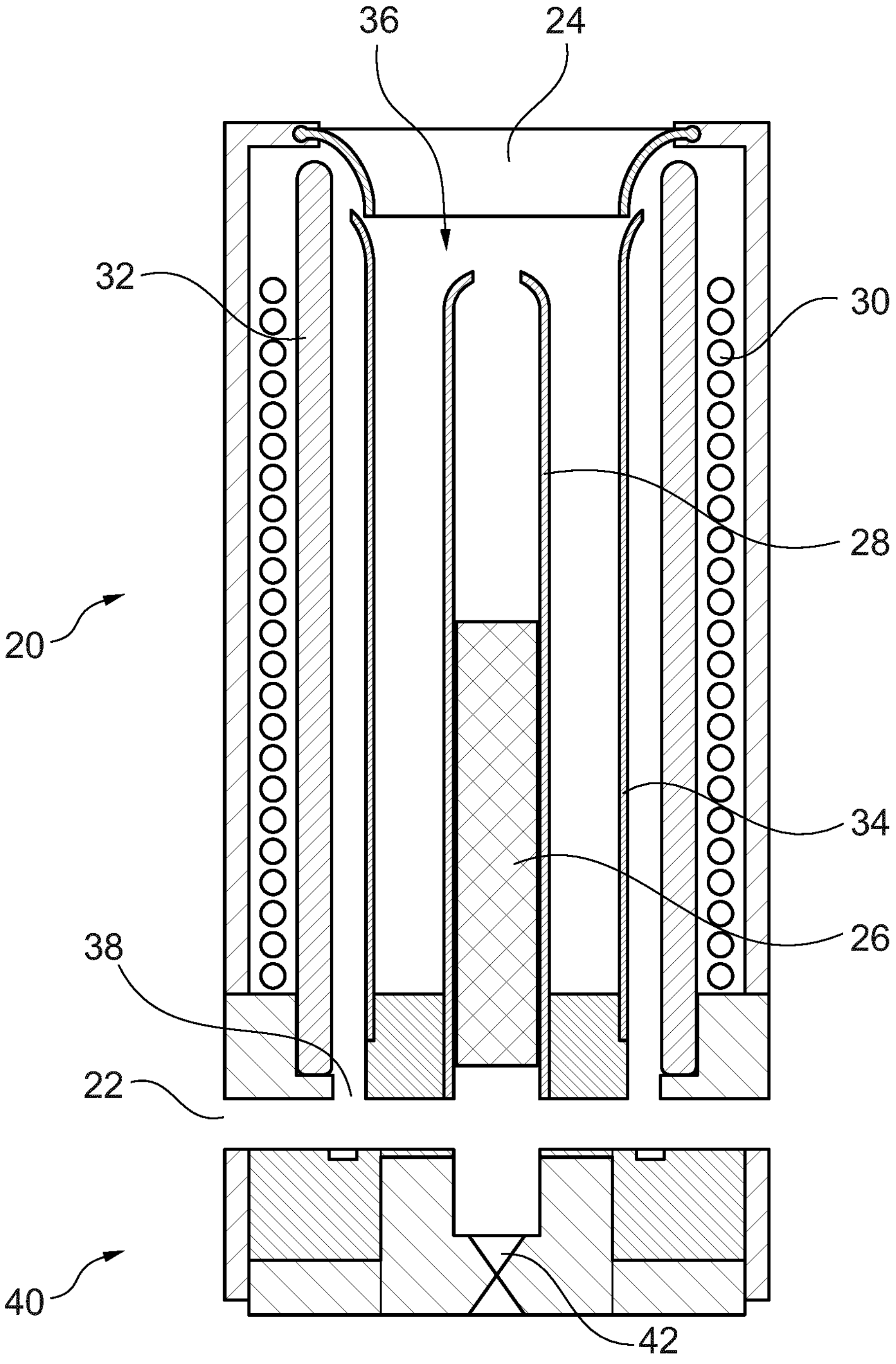
FIG. 3 shows a cross-sectional view of mouth-end portion with proximal part of liquid storage portion of an embodiment of an aerosol-generating system of the invention.

FIG. 3 shows a cross-sectional view of mouth-end portion 20 and a proximal part of liquid storage portion 40 of an embodiment of an aerosol-generating system 10 of the invention. In difference to the embodiment of FIG. 2, the embodiment of FIG. 3 comprises a second heating element 34. The second heating element 34 comprises a susceptor material, which heats in response to an alternating magnetic field generated by inductor 30.

The aerosol-generating system further comprises a cavity 36 for receiving an aerosol-generating article comprising a solid aerosol-forming substrate (not shown in FIG. 3). The cavity 36 is provided in the mouth-end portion 20. The first heating element 28 is arranged within the cavity 36. The wick 26 is arranged within the first heating element 28. The first heating element 28 is arranged to heat the liquid in the wick 26. Alternatively or in addition, the first heating element 28 may heat an inside portion of a hollow cylindrical tube of an aerosol-generating article when the article is inserted into the cavity 36. The outer walls of the cavity 36 are formed by the susceptor material of the second heating element 34. The second heating element 34 is thus arranged surrounding the cavity 36. The first heating element 28 comprises a central susceptor arrangement arranged centrally within the cavity 36. The second heating element 34 comprises a peripheral susceptor arrangement arranged distanced from and around the central susceptor arrangement.

An aerosol-generating article to be inserted into the cavity may comprise a hollow cylindrical tube comprising a solid aerosol-forming substrate at its distal end thereof and a mouthpiece including a mouthpiece filter at its proximal end thereof. The distal end of the aerosol-generating article may be inserted into the cavity 36 such that the hollow cylindrical tube is arranged between the susceptor material of the first heating element 28 and the susceptor material of the second heating element 34. The aerosol-generating article can thus be coaxially sandwiched between the central susceptor arrangement and the peripheral susceptor arrangement. The aerosol-generating article may be heated by the second heating element 34. The aerosol-generating article may be additionally heated by the first heating element 28.

An optional bypass aperture 38 is provided in the airflow passage. The bypass aperture 38 is fluidly connected with the air outlet 24 via apertures in the susceptor material of the second heating element 34. For example, the second heating element 34 may comprise a plurality of separate heating blades arranged in a cylindrical configuration and the space between neighbouring heating blades may define the apertures. The heating blades may comprise a susceptor material. A bypass airflow passage extends from the bypass aperture 38 through the apertures in the susceptor material of the second heating element 34 into the aerosol-generating article and further to the air outlet 24. Airflow routes along the airflow passage and the bypass airflow passage are exemplified by means of meandering arrows in FIG. 6.

Figure 4:
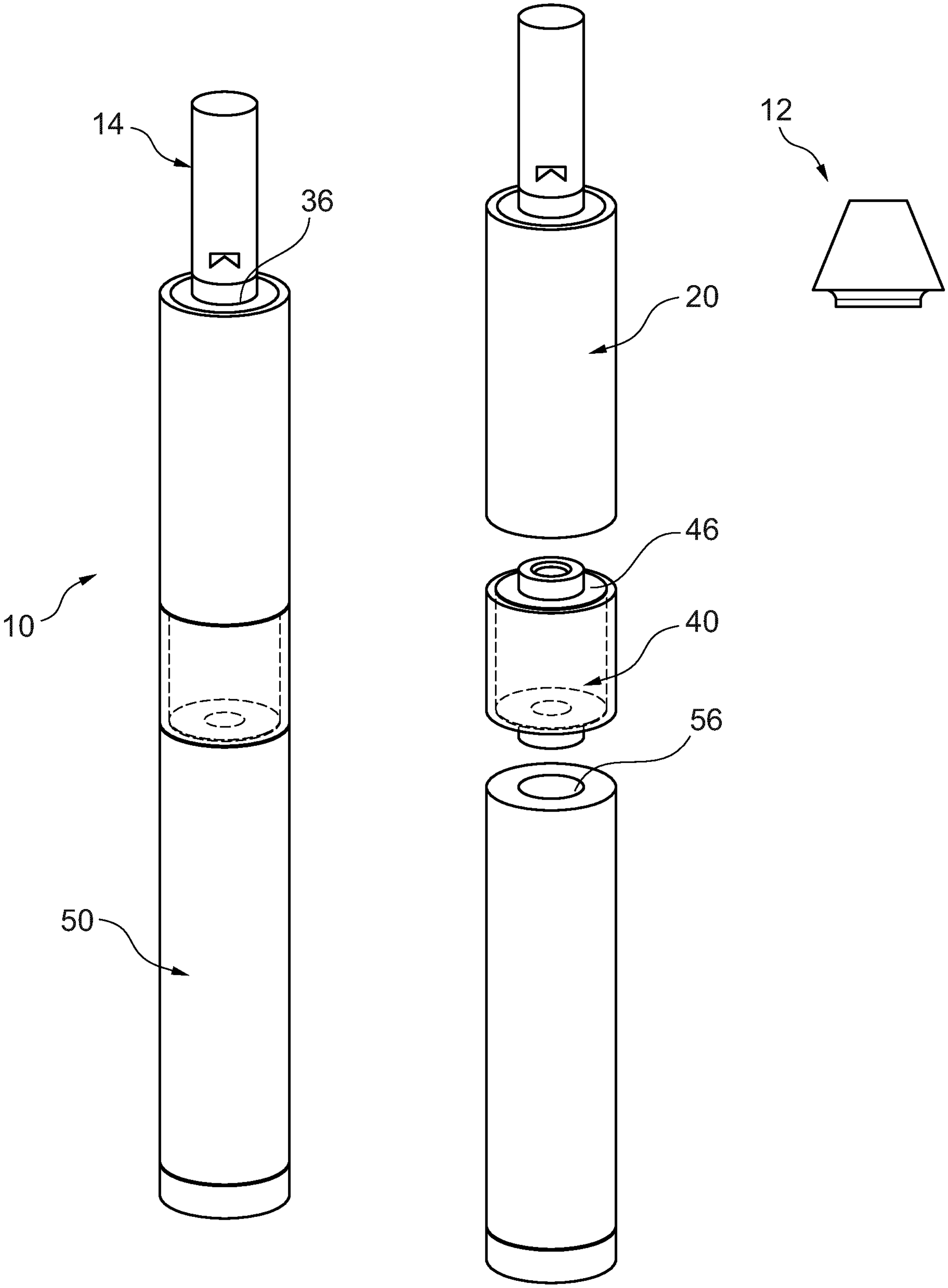
FIG. 4 shows an embodiment of an aerosol-generating system of the invention.

FIG. 4 shows an aerosol-generating system 10 according to an embodiment of the invention. The left-hand side of FIG. 4 shows the aerosol-generating system 10 in an assembled state. An aerosol-generating article 14 is inserted into the cavity 36. The middle of FIG. 4 shows the aerosol-generating system 10 in an exploded view, wherein mouth-end 20, liquid storage portion 40, and main body 50 are not attached to each other. The aerosol-generating system 10 is configured to removably receive the liquid storage portion 40. The proximal end of the main body 50 comprises a main body connector 56 for removably attaching the main body 50 to a storage portion main connector (not shown) of the liquid storage portion 40. The distal end of the mouth-end portion 20 comprises a corresponding connector (not shown) for removably attaching mouth-end portion 20 to a storage portion mouth-end connector 46 of the liquid storage portion 40. The right-hand side of FIG. 4 shows an optional mouthpiece 12 which may be attached onto the open end of the cavity 36 when no aerosol-generating article 14 is inserted into the cavity 36.

The aerosol-generating system 10 may enable three different modes of operation.

According to a first mode of operation shown at the left-hand side of FIG. 4, the liquid storage portion 40 is received in the system 10 and, additionally, an aerosol-generating article 14 is received in the cavity 36. Therefore, an inhalable aerosol may contain substances which are derived from the liquid storage portion 40 and, additionally, substances derived from the aerosol-forming substrate comprised in the aerosol-generating article 14.

According to a second mode of operation, the liquid storage portion 40 is not received in the system 10 and the distal end of mouth-end portion 20 is directly removably attached to the proximal end of main body 50. Further, an aerosol-generating article 14 is received in the cavity 36. Therefore, an inhalable aerosol may contain substances derived from the aerosol-forming substrate comprised in the aerosol-generating article 14, only.

According to a third mode of operation, the liquid storage portion 40 is received in the system 10, but no aerosol-generating article 14 is received in the cavity 36. Optionally, the mouthpiece 12 may be attached onto the open end of the cavity 36. Therefore, an inhalable aerosol may contain substances which are derived from the liquid storage portion 40, only.

A user may choose between the different modes of operation. Thereby, a modular aerosol-generating system 10 may be provided advantageously enabling three different modes of operations in one single system. Thus, it is not necessary for a user to carry three different systems for each mode of operation, but only one system. Also, a user may not need to buy three different systems, but only one system, which may be cost saving.

Figure 5:
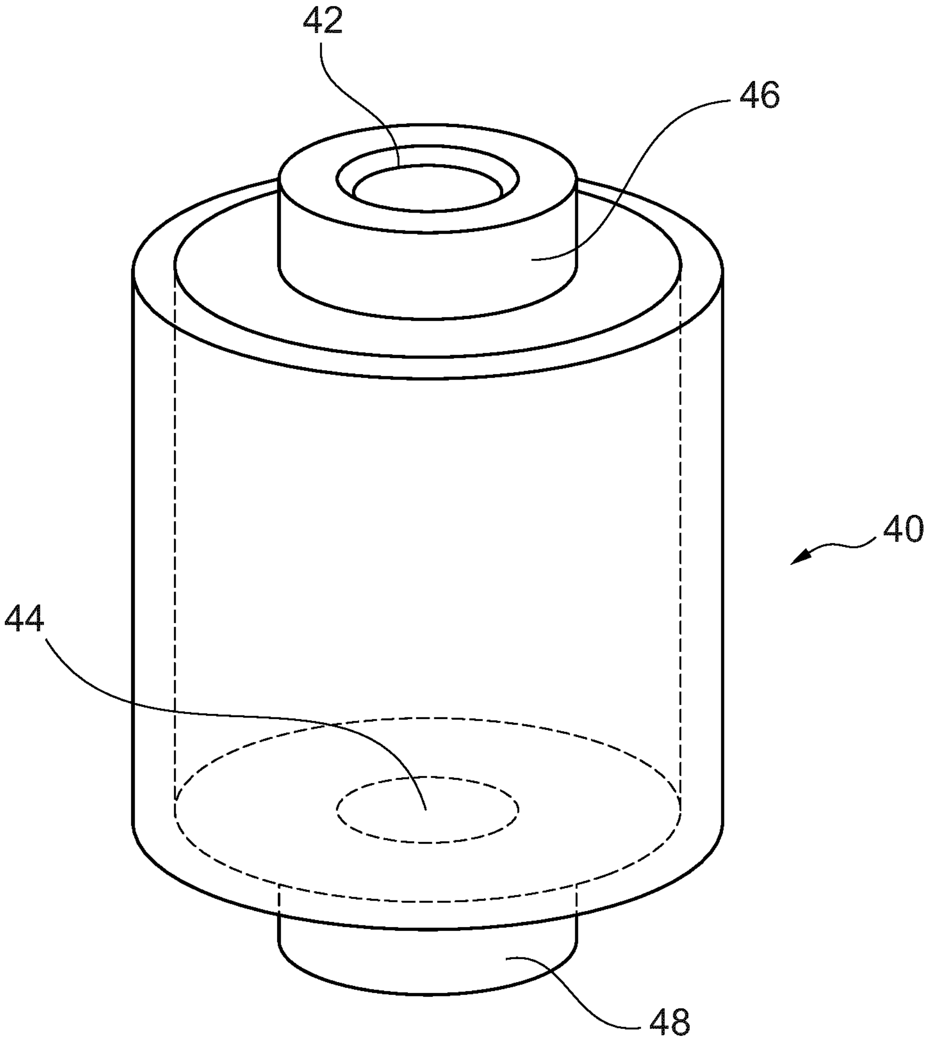
FIG. 5 shows a liquid storage portion of an embodiment of an aerosol-generating system of the invention.

FIG. 5 shows a liquid storage portion 40 of an embodiment of an aerosol-generating system 10 of the invention. The liquid storage portion 40 comprises a liquid outlet 42 and a storage portion air inlet 44. The liquid storage portion 40 further comprises a storage portion mouth-end connector 46 for removably attaching the liquid storage portion 40 to the distal end of the mouth-end portion 20. The liquid storage portion 40 further comprises a storage portion main connector 48 for removably attaching the liquid storage portion 40 to a main body connector 56 at the proximal end of the main body 50. The liquid storage portion 40 of FIG. 5 may be used in the aerosol-generating system 10 of the embodiment of FIG. 4.

Figure 6:
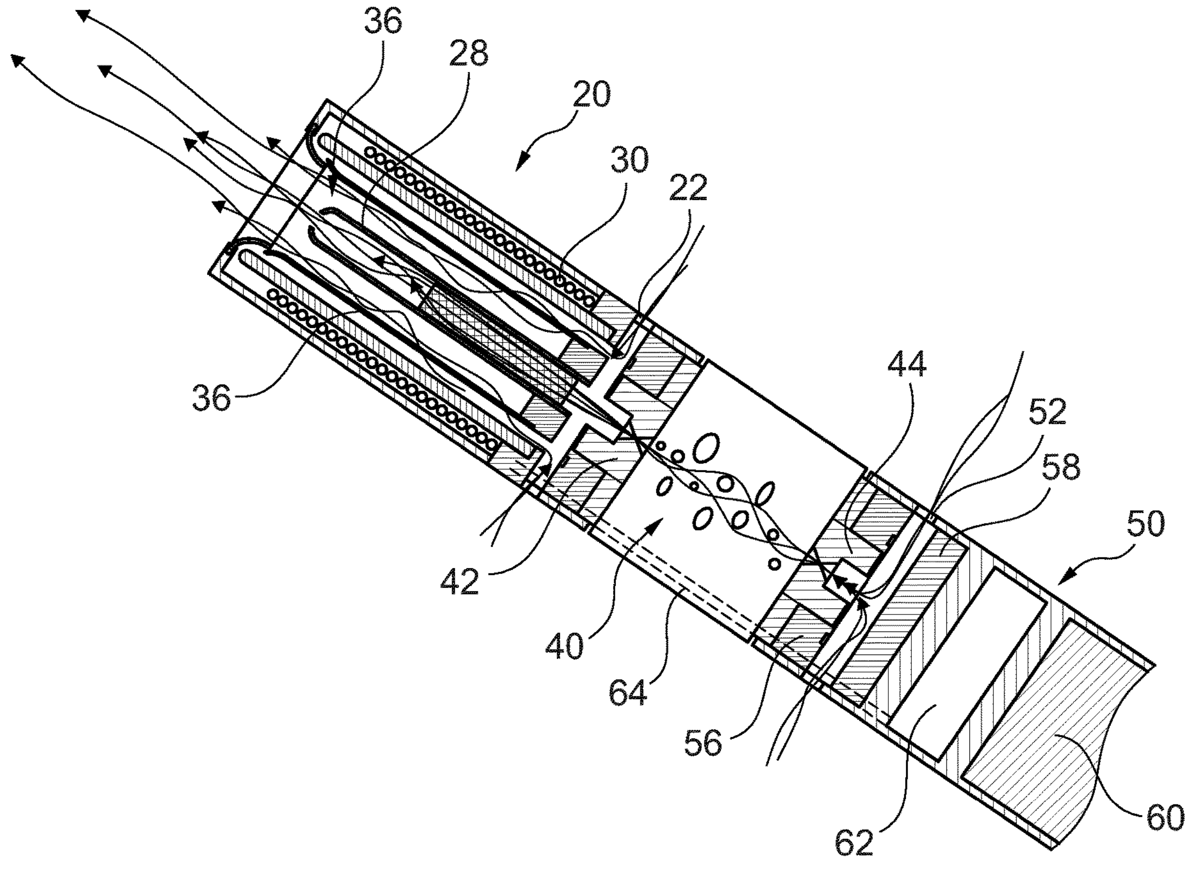
FIG. 6 shows an embodiment of an aerosol-generating system of the invention.

FIG. 6 shows an aerosol-generating system 10 according to an embodiment of the invention. The aerosol-generating system 10 comprises a mouth-end portion 20, a liquid storage portion 40, and a main body 50. A cavity 36 for receiving an aerosol-generating article (not shown) is provided in the mouth-end portion 20. The liquid storage portion 40 is arranged between the mouth-end portion 20 and the main body 50. The first heating element 28 is provided in the mouth-end portion 20. The second heating element 34 is provided in the mouth-end portion 20. The first air inlet 22 is provided in the mouth-end portion 20. Mouth-end portion 20 of FIG. 6 corresponds to mouth-end portion 20 of the embodiment of FIG. 3.

The main body 50 comprises a second air inlet 52 and is connected to the liquid storage portion 40 by the main body connector 56. The main body 50 comprises a high retention material 58 being arranged in proximity to the storage portion air inlet 44 for absorbing potential leaks of the liquid storage portion 40. The main body 50 further comprises a power supply 60 for powering both the first and second heating element 28, 34. Electrically connected to the power supply 60, the main body 50 further comprises a controller 62 for controlling the power supply 60. Additionally, the aerosol-generating system 10 comprises electrical connecting means 64 for electrically connecting the inductor 30 to the controller 62 and the power supply 60.

The aerosol-generating system 10 further comprises a second air inlet 52 that is fluidly connected to the storage portion air inlet 44. The second air inlet 52 is arranged in the main body 50.

The aerosol-generating system 10 provides different routes for the airflow as indicated by meandering arrows in FIG. 6. First and second routes for the airflow extend along the airflow passage and the bypass airflow passage as explained above with respect to the embodiment of FIG. 3. A third airflow route extends via an additional storage portion airflow passage extending from the second air inlet to the storage portion air inlet. The third airflow route further extends through the liquid contained in the liquid storage portion 40. By means of the third airflow route extraction of liquid from the liquid storage portion 40 via the liquid outlet 42 may be advantageously promoted.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A ±five percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating system, comprising:

a first air inlet and an air outlet;

a liquid storage portion holding a liquid aerosol-forming substrate, the liquid storage portion having a liquid outlet;

an airflow passage from the first air inlet to the air outlet past the liquid outlet;

a wick in the airflow passage arranged to receive liquid from the liquid storage portion in response to a pressure drop in the airflow passage at the liquid outlet; and a first heating element positioned to heat the liquid in the wick, wherein the wick is arranged at a distance from the liquid outlet, wherein the liquid storage portion further comprises a storage portion air inlet, wherein the airflow passage extends from the first air inlet to the air outlet past the storage portion air inlet and past the liquid outlet such that air enters the liquid storage portion via the storage portion air inlet and then travels through the liquid storage portion and exits the liquid storage portion at the liquid outlet, wherein the first heating element comprises a susceptor material, which heats in response to an alternating magnetic field generated by an inductor arranged in the aerosol-generating system, and wherein the inductor is a helical coil that surrounds both the first heating element and a second heating element.

2. The aerosol-generating system according to claim 1, wherein the liquid outlet of the liquid storage portion opens in response to a pressure drop in the airflow passage.

3. The aerosol-generating system according to claim 1, further being configured to removably receive the liquid storage portion.

4. The aerosol-generating system according to claim 1, further comprising a cavity configured to receive an aerosol-generating article comprising a solid aerosol-forming substrate.

5. The aerosol-generating system according to claim 4, wherein the second heating element is arranged in the cavity for heating the solid aerosol-forming substrate.

6. The aerosol-generating system according to claim 4, further comprising a mouth-end portion and a main body, wherein the cavity is provided in the mouth-end portion, and wherein the liquid storage portion is arranged between the mouth-end portion and the main body.

7. The aerosol-generating system according to claim 6, wherein the second heating element is arranged in the cavity for heating the solid aerosol-forming substrate, and wherein the main body comprises a power supply configured to power both the first heating element and the second heating element.

8. The aerosol-generating system according to claim 6, wherein the first heating element is provided in the mouth-end portion.

9. The aerosol-generating system according to claim 6, wherein the first air inlet is provided in the mouth-end portion.

10. The aerosol-generating system according to claim 1, further comprising a second air inlet that is fluidly connected to the storage portion air inlet.

11. The aerosol-generating system according to claim 10, further comprising:

a cavity configured to receive an aerosol-generating article comprising a solid aerosol-forming substrate, and a mouth-end portion and a main body, wherein the cavity is provided in the mouth-end portion, wherein the liquid storage portion is arranged between the mouth-end portion and the main body, and wherein the second air inlet is arranged in the main body.

12. An aerosol-generating system, comprising:

a first air inlet and an air outlet;

a liquid storage portion holding a liquid aerosol-forming substrate, the liquid storage portion having a liquid outlet;

an airflow passage from the first air inlet to the air outlet past the liquid outlet;

a wick in the airflow passage arranged to receive liquid from the liquid storage portion in response to a pressure drop in the airflow passage at the liquid outlet;

a first heating element positioned to heat the liquid in the wick, a cavity configured to receive an aerosol-generating article comprising a solid aerosol-forming substrate; and a second heating element arranged in the cavity for heating the solid aerosol-forming substrate, wherein the second heating element comprises a susceptor material, which heats in response to an alternating magnetic field generated by an inductor arranged in the aerosol-generating system, wherein the wick is arranged at a distance from the liquid outlet, wherein the liquid storage portion further comprises a storage portion air inlet, wherein the airflow passage extends from the first air inlet to the air outlet past the storage portion air inlet and past the liquid outlet such that air enters the liquid storage portion via the storage portion air inlet and then travels through the liquid storage portion and exits the liquid storage portion at the liquid outlet, and wherein the inductor is a helical coil that surrounds both the first heating element and the second heating element.

* * * * *